United States Patent
Howald et al.

(10) Patent No.: US 6,474,383 B1
(45) Date of Patent: Nov. 5, 2002

(54) AUTOMOTIVE WHEEL WITH IMPROVED INFLATION SYSTEM

(75) Inventors: Gene A. Howald, New Hope, PA (US); Pascal Seradarian, Princeton, NJ (US)

(73) Assignee: Hutchinson, S.A., Paris (FR)

( * ) Notice: Subject to any disclaimer, the term of this patent is extended or adjusted under 35 U.S.C. 154(b) by 0 days.

(21) Appl. No.: 09/867,513

(22) Filed: May 31, 2001

(51) Int. Cl.[7] .............................................. B60C 29/00
(52) U.S. Cl. ...................... 152/418; 152/416; 152/427
(58) Field of Search ..................... 301/95.101; 152/415, 152/416, 418, 427, 428

(56) References Cited

U.S. PATENT DOCUMENTS

| | | | |
|---|---|---|---|
| 2,969,824 A | * | 1/1961 | Howard |
| 4,733,707 A | * | 3/1988 | Goodell et al. ............. 152/417 |
| 4,765,385 A | * | 8/1988 | McGeachy ................. 152/416 |
| 5,221,381 A | * | 6/1993 | Hurrell, II .................. 152/416 |
| 5,313,996 A | * | 5/1994 | Bragg ......................... 152/427 |
| 5,975,174 A | * | 11/1999 | Loewe ........................ 152/415 |

* cited by examiner

Primary Examiner—Russell D. Stormer
(74) Attorney, Agent, or Firm—Shlesinger Fitzsimmons Shlesinger

(57) ABSTRACT

An automotive wheel rim has intermediate its ends a wall extending transversely of the axis of said rim and having formed therein a first air duct opening at one end on the outer periphery of the rim for communication with the interior of a tire mounted thereon, and at its opposite end on the outboard side of the wall. A second duct formed within the wall opens at one end on the outboard side of the wall and at its opposite end on the inboard side of the wall for connection to a tire inflation system. A tire inflation control valve is secured to the outboard side of the wall and has therein a pair of air inlet/outlet ducts sealingly secured in communication with the ends of the first and second ducts where they open on the outboard side of the wall.

10 Claims, 2 Drawing Sheets

AUTOMOTIVE WHEEL WITH IMPROVED INFLATION SYSTEM

BACKGROUND OF THE INVENTION

Figure 1:
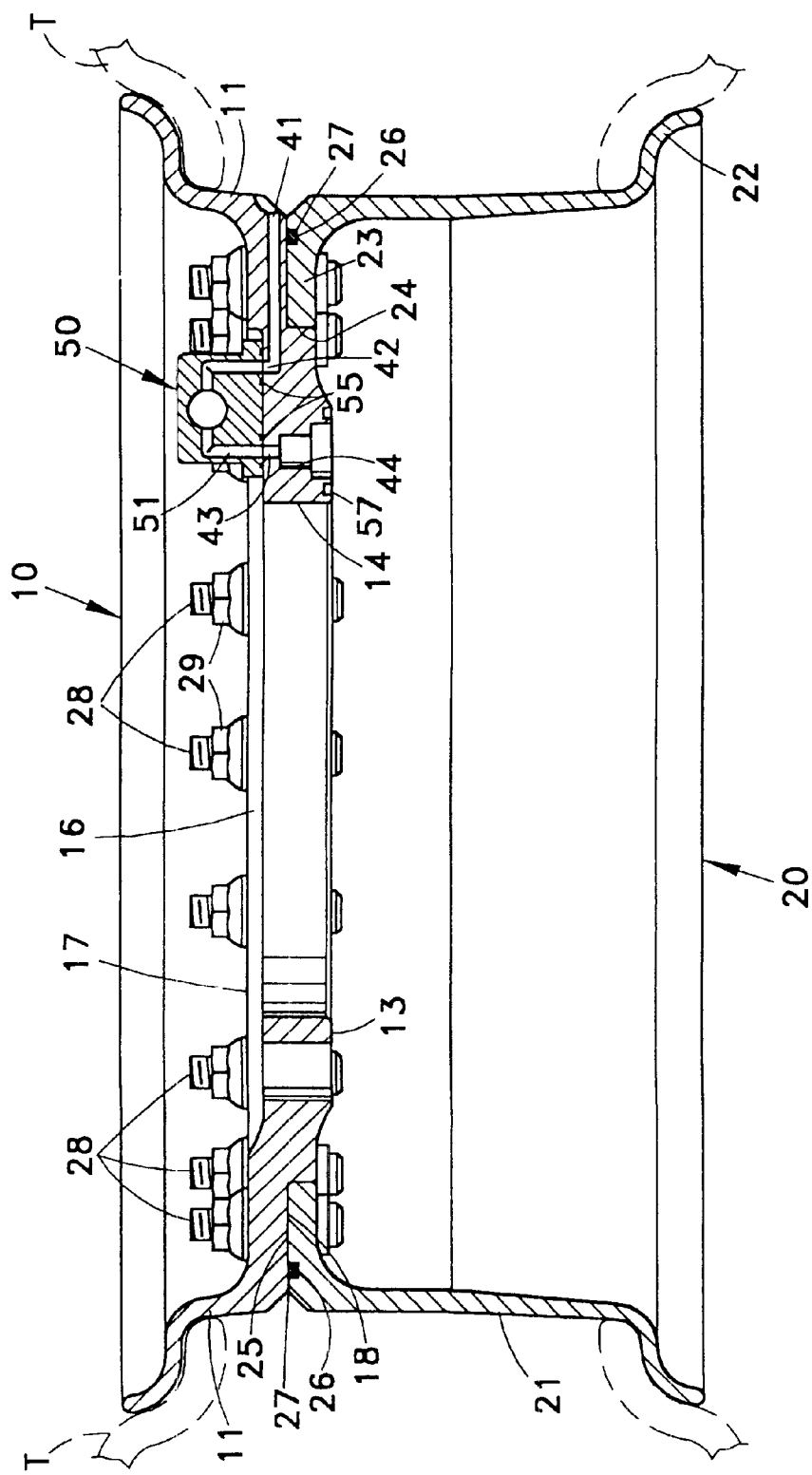

This invention relates to automotive wheels of the type designed for use with pneumatic tubeless tires, and more particularly to wheels of the type described which utilize special inflation systems that are employed for inflating the associated tubeless tires. Even more specifically this invention relates to an improved such wheel having formed inside the hub face of the wheel a network of air passages for use with an inflation system of the type described.

It has long been customary to employ with certain types of vehicles special automotive wheels connected to a central tire inflation system (CTIS), for example an on-board pump for producing compressed air to be transferred through various wheelmounted valves and hoses to the tubeless tires that are mounted on the vehicle's wheels. For example, a wheel of the type disclosed in U.S. Pat. No. 4,836,261 employs an inflation valve which is secured to the wheel rim between its bead retaining flanges so that an outlet port of the valve communicates with the interior of the tubeless tire on the rim. The inlet port to the valve, on the other hand, is connected by a tubular valve stem to an opening in the outwardly facing section of the rim where it is secured in position to receive compressed air from a supply thereof Systems of the type noted above function very well when the goal is simply to introduce air into a tire and to maintain it there until it is purposely evacuated or subjected to a blowout, or the like. However, in some cases, such as in the case of a military wheel, it is not unusual to require multiple air pressure settings, such as for example when the vehicle is traveling over rough, off road terrain, in mud or snow, or on hard paved surfaces. Operation on these various terrains require different air pressure settings for the tires in order to optimize the tractability of the vehicle. To effect a change in the air pressure without stopping or leaving the vehicle, it heretofore has been necessary to bolt or otherwise secure to the outside of the associated wheels certain elements of the inflation system, thus creating tire imbalance, and potential breakage or damage to the exposed inflation components, and increasing the overall weight and cost of the inflation system.

It is an object of this invention, therefore, to provide an improved automotive wheel which significantly eliminates the need for many of the components heretofore employed in tire inflation systems of the type described, thus eliminating many of faulty leak sites that exist in such prior systems.

Still another object of this invention is to provide an improved automotive wheel of the type described which not only is designed for use in connection with a central inflation system, but which also utilizes improved means for preventing any undesirable leakage of compressed air from the tubeless tire mounted on the wheel.

A more specific object of this invention is to provide an improved wheel of the type described wherein the numerous air passages for conveying air to and from the tubless tire thereon are formed internally of the wheel rim itself, and within the cross section thereof.

Other objects of this invention will be apparent hereinafter from the specification and from the recital of the appended claims, particularly when read in conjunction with the accompanying drawings.

SUMMARY OF THE INVENTION

A wheel for a tubeless tire is made in the form of a circular rim having outwardly flaring circumferential flanges on opposite ends thereof for engagement by the beads of a tubeless tire mounted on the rim. Intermediate its ends the rim has a wall extending transversely of its axis and the wall has therethrough a central opening disposed coaxially of the rim.

To control air flow to a tire on the rim the transverse wall has therein a first air duct which opens at one end on the outer periphery of the rim for communication with the interior of the tire mounted thereon, and opens at its opposite end on the outboard or outwardly facing side of the wall.

A second air duct is formed within the wall section to open at one end on the outboard side of the wall, and to open at its opposite end on the opposite or inboard side of the wall for connection to a central tire inflation system. Air flow is controlled by a tire inflation control valve which is secured to the outboard side of the wall, and which has therein a pair of air inlet/outlet ducts sealingly secured in communication at the outboard surface of the wall with its first and second ducts, respectively.

THE DRAWINGS

Figure 3:
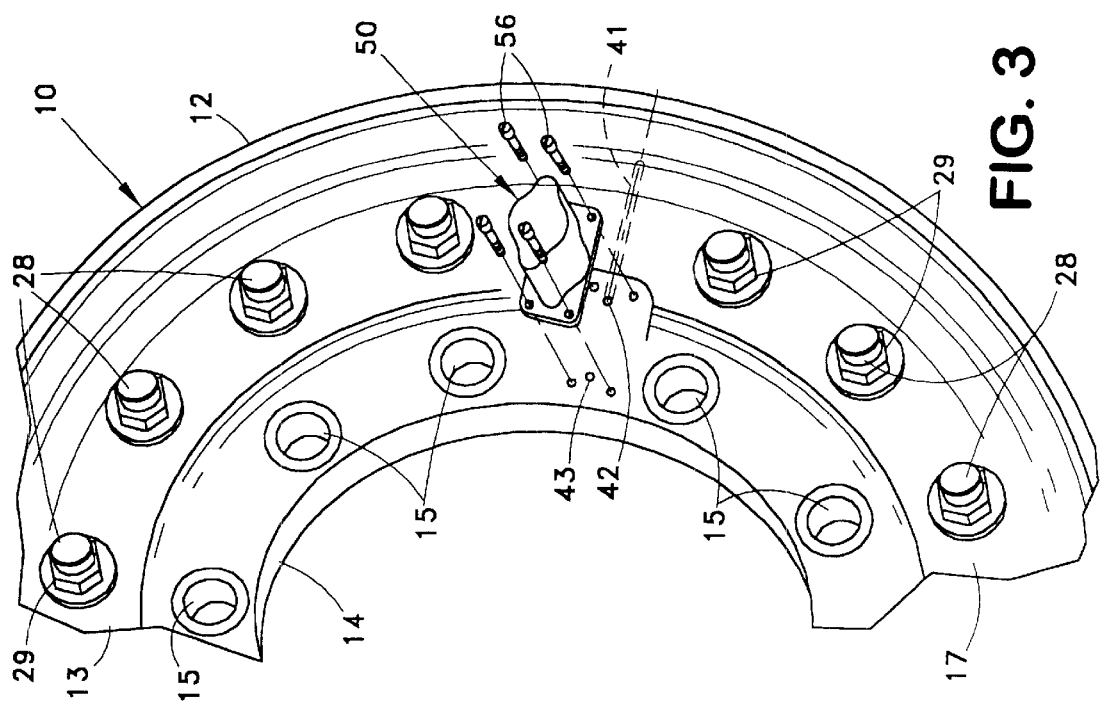
Figure 2:
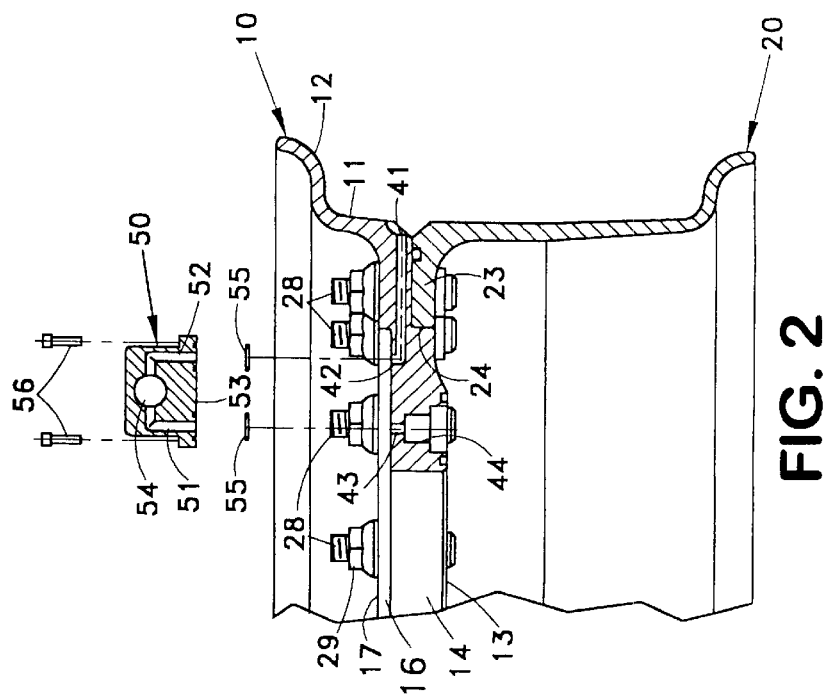

FIG. 1 is a cross sectional view through the center of a circular, automotive wheel made according to one embodiment of this invention, portions of the tire mounted on the wheel being shown fragmentarily and in phantom by broken lines;

FIG. 2 is an exploded, fragmentary view of the of the wheel as shown in FIG. 1, by means of which the associated air valve and its mounting bolts are shown as they appear before the valve is bolted to the face of the wheel; and FIG. 3 is a fragmentary perspective view of a portion of the wheel as shown in FIG. 2, and with the valve and its mounting bolts or screws again being shown in an exploded format as they appear before being secured to the outer face of the wheel.

DETAILED DESCRIPTION OF THE PREFERRED EMBODIMENTS

Referring now to the drawings by numerals of reference, FIG. 1 is an axial section view through the center of a two piece wheel comprising a circular, outer rim section denoted generally by the numeral 10, and an inner, circular rim section denoted generally by the numeral 20. Intermediate its ends the outer rim section 10 has an annular wall section 11 surrounded at its open outer end by an integral, outwardly flaring circumferential flange section 12, and is closed at its inner end by an integral, transversely extending wall section 13. Section 13 has therethrough, and centrally thereof, a reduced-diameter opening 14 which is disposed coaxially of section 10, and which is surrounded coaxially by a circular array of smaller, circular openings 15 (FIG. 2) which are equiangularly spaced from each other about the axis of section 10, and in rather slight, radially spaced relation to the central opening 14. At their outer ends (their upper ends in FIG. 1) the openings 14 and 15 open upon a shallow, circumferential recess 16 formed coaxially in the otherwise plane outer (upper in FIG. 1) surface 17 of the wall section 13. Radially outwardly of the circular array of openings 15 the wall section 13 has formed coaxially in the inner side thereof (the lower side in FIG. 1) a circumferential, annular recess 18 opening at one end on the annular wall 11, and having a plane bottom surface which registers with, and extends parallel to, the plane outer surface 17 of the section 10.

As shown more clearly in FIG. 1, the inner rim section 20 also is generally cup-shaped in configuration, and like section 10 has intermediate its ends an annular wall section 21 having a diameter substantially equal to the annular wall section 11 of the outer rim section 10, but which happens to have an axial length substantially greater than the axial length of the section 11. Remote from its flanged open end 22 the annular wall section 21 has integral therewith a wall section 23 which extends transversely of the axis of sections 10 and 20, and which has therethrough coaxially of the sections 10 and 20 a centrally disposed, circular opening 24. The bore wall of opening 24 surrounds and is coaxially engaged with the radial inner end or bottom of the recess 18 in wall section 13 of the rim section 10. Wall section 23 also has thereon a plane, flat outer surface 25 having formed therein adjacent the outer peripheral surface of the annular wall section 21, a rather shallow, circular recess 26 disposed coaxially of the section 20 for a purpose noted hereinafter.

To assemble the two sections 10 and 20 to form a wheel for accommodating a tubeless tire T, a resilient O-ring 27 is seated in the circular recess 26, which is nearly semi-circular in cross sectional configuration, so that a good portion of the O-ring projects from the recess 26. The wall section 23 of the inner rim section 20 is then seated in the circumferential recess 18 in the wall section 13 of section 10, and in such manner that a circular array of circular openings in the section 13 register with a like, array of circular openings in the section 23. These registering openings accommodate the externally threaded shanks of an array of bolts 28, which extend through the registering openings in the sections 13 and 23 in order to fasten those sections securely together by nuts 29 that are screwed to the various bolts 28 in a conventional manner. When the sections 13 and 23 are thus bolted together, the plane surface 25 on section 23 is secured into coplanar engagement with the planar surface formed on section 13 by the recess 18, and in such manner that the O-ring 27 is compressed by the surface of section 13 to form an airtight seal between the two rim sections 10 and 20 adjacent the outer peripheral surface of the annular sections 11 and 21 thereof. As shown in phantom by broken lines in FIG. 1, the tubeless tire T can then be mounted on the assembled wheel as shown in phantom by broken lines in FIG. 1, with the outboard and inboard beads of the tire being seated against the respective flange sections 12 and 22.

In order to be able to supply air under pressure to a tubeless tire mounted on a two piece wheel rim comprising the sections 10 and 20, the outer rim section 10 has formed in its wall section 13 adjacent and parallel to the plane surface 25 thereof a radially extending air duct 41, which is circular in cross section, and which opens at its outer end on the outer peripheral surface of the annular wall section 11. Duct 41 communicates at its inner end with the lower end of a small, circular opening 42, which is formed in the bottom of the shallow recess 16 in wall section 13 adjacent the outer peripheral surface of the recess 16. At a point spaced radially inwardly from the opening 42, another small, circular opening 43 is formed in the bottom of the shallow recess 16, and registers coaxially at its inner end (the lower end in FIG. 1) with the inner end of a slightly enlarged-diameter counterbore 44 which is formed in the inner surface of the wall section 13 coaxially of the opening 43.

A conventional central tire inflation valve such as offered for sale, for example, by C. M. Automotive, and which is denoted generally by the numeral 50, has therein a pair of spaced, parallel air inlet and air outlet ducts 51 and 52, respectively, which as shown in FIG. 2 open at their outer ends on a plane, flat bottom surface 53 of the valve, and which communicate at their inner ends to a conventional valve mechanism (not illustrated) which is housed in a recess 54 within the valve 50. Where they open on the surface 53, the outer ends of the ducts 51 and 52 are surrounded by resilient O-rings 55 which are disposed to be seated in and project partially from circular, registering recesses that are formed in surface 53 to surround the outer ends of ducts 51 and 52 in radially spaced relation thereto. Valve 50 is disposed to have its plane bottom surface 53 secured snugly and in coplanar relation with the plane, bottom surface of the recess 16 in wall section 13 by a plurality (four in the embodiment illustrated) of bolts or screws 56, and in such manner that the outer end of duct 52 registers with the opening 42 in wall section 13, and the outer end of the duct 51 registers exactly with the opening 43 in wall section 13. In this manner the duct 41 is placed in communication with valve duct 52, while opening 43 and its associated counterbore 44 are placed in communication with the valve duct 51. Also, and very importantly, the O-rings 55 which surround the outer ends of the ducts 51 and 52 are sealingly engaged by and compressed by the plane bottom surface of the recess 16 in wall section 13. Duct 41 thus remains sealingly connected to valve duct 52 and valve duct 51 remains sealingly connected to opening 43 and its counterbore 44, and as noted hereinafter, to any portion of the central tire inflation system that is designed to be connected to counterbore 44.

In use, openings 15 are adapted to accommodate the studs normally employed for securing the wheel 10 to the axle of a vehicle, and in which case the inner rim section 20 faces inwardly of the vehicle, and rim section 10 faces outwardly. The inwardly facing counterbore 44 of the wall section 13 forms an inlet interface for accommodating the component (not illustrated) which is employed to connect the valve inlet duct 51 to a central tire inflation system, or the like. For this purpose the surface of the wall section 13 at the outer end of the counterbore 44 ideally would be provided with a circular recess 57 disposed coaxially about the outer end of counterbore 44 for accommodating an O-ring (not illustrated), which would be utilized to provide a sealed connection between the air filtration system component, or the like, which is connected to counterbore 44. When such a system is connected to the counterbore 44, such connection would be located within the inner rim section 20 therefore leaving the sealed valve 50 being the only element or component of the system disposed outside of the hub face of the wheel. Air supplied by the system would then pass through the valve inlet duct 51, the valve control mechanism, the outlet duct 52 and the supply inlet duct 41 to the interior of the tire T. Conversely, air released by the system from the tire would pass in the reverse direction through valve 50 and under the control thereof.

While the invention has been described in detail above in connection with a two-piece tire rim or wheel, which by way of example may be made from forged aluminum, or the like, it will be apparent that this invention is capable of being employed with different types of wheels, such as for example a one-piece wheel or even a multi-piece wheel such as for example the type disclosed in the above-noted U.S. Pat. No. 4,836,261. By way of example, in a one-piece wheel the wall section 23 could be integral with the registering portion of the wall section 13 in which case the duct 41 and the openings 42, 43 and counterbore 44 would be formed in a one-piece unit rather than being formed in two separate sections 10 and 20. In the event that multiple sections are employed, the principle would be the same. The valve 50 would be the only component of the overall tire inflation system disposed on the outer surface of the rim hub, and would have its ducts 51 and 52 registering with openings in other air ducts which would be formed completely within other sections of the wheel. Also, it is to be understood that the illustrated valve 50 is only one of a number of conventional type valves which can be employed for producing a central tire inflation system of the type referred to above. In any case, the advantage of employing air routing ducts or routes that are located inside of the face of the wheel, and more specifically internally of the cross section of the wheel, is the fact that there will be a considerable reduction in the installation and maintenance costs as compared with prior such systems, as well as a significant reduction in the overall weight of the system. In the event that a two-piece wheel of the type described is employed with the system, the use of the resilient O-ring 27 in the recess 26 in the rim section 20 provides a simple and very effective way of preventing any undesirable leakage of air from an associated tire between the two sections 10 and 20 of the wheel.

Moreover, while this invention has been illustrated and described in detail in connection with only certain embodiments thereof, it will be apparent to one skilled in the art that the invention is capable of still further modification, and that this application is intended to cover any such modifications as may fall within the scope of one skilled in the art, or the appended claims.

What is claimed is:

1. An automotive wheel for use with a tubeless tire, comprising a circular rim having formed coaxially on opposite ends thereof outwardly flaring circumferential flange sections disposed to be engaged by the beads of a tubeless tire mounted on the rim, said rim having intermediate said opposite ends thereof a transverse wall section extending transversely of the axis of said rim, and having therethrough a central opening disposed coaxially of said axis, a first air duct formed within said wall section to open at one end thereof on the outer periphery of said rim for communication with the interior of the tire mounted thereon, and opening at the opposite end thereof on one side of said wall section, a second air duct formed within said wall section to open at one end on said one side of said wall section and opening at its opposite end on the opposite side of said wall section for connection to a tire inflation system, and a tire inflation control valve secured to said one side of said wall section and having therein a pair of air inlet/outlet ducts, one of said pair of ducts being sealingly secured at one end thereof to said opposite end of said first duct, and the other of said pair of ducts being sealingly secured at one end thereof to said one end of said second duct.

2. An automotive wheel as defined in claim 1, wherein said wall section of said rim has therethrough outwardly of said central opening a circular array of openings for use in mounting said rim on the axle of a vehicle with said one side of said wall section facing outwardly of the vehicle.

3. An automotive wheel as defined in claim 1, wherein said rim is made of forged aluminum.

4. An automotive wheel as defined in claim 1, wherein said wall section is one of two wall sections of said rim releasably secured together to extend transversely of said axis of the rim, and the other of said two wall sections has therethrough a central opening larger than and disposed coaxially of the central opening in said one wall section.

5. An automotive wheel as defined in claim 4, wherein radially outwardly of said central openings registering portions of said wall sections have thereon confronting, circumferential surfaces engaged one with the other, and a resilient O-ring is sealingly secured between said confronting, circumferential surfaces and radially outwardly of said control valve.

6. An automotive wheel as defined in claim 5, wherein said two wall sections are releasably secured together by a plurality of nut and bolt combinations arranged in a circular array coaxially of said rim, and with the bolt of each such combination extending through a pair of registering openings in said registering portions of said wall sections.

7. An automotive wheel as defined in claim 1, wherein the ends of said first and second ducts which open on said one side of said wall section are spaced a predetermined distance from each other, and said one ends of said pair of ducts in said control valve are also spaced said predetermined distance from each other and register coaxially with said ends of said first and second ducts which open on said one side of said wall section.

8. An automotive wheel as defined in claim 1, wherein said opposite end of said second duct has therein a counterbore for accommodating a fitting of said tire inflation system.

9. An automotive wheel as defined in claim 1, wherein said one side of said wall section has therein a shallow, circumferential recess surrounding said central opening coaxially thereof, and said opposite end of said first duct and said one end of said second duct form in the bottom of said circumferential recess a pair of spaced, circular openings registering with and sealingly connected via intervening resilient O-rings with said one ends of said pair of ducts in said control valve.

10. An automotive wheel as defined in claim 1, wherein the circumferential flange section at one end of said rim is disposed to face inwardly of the vehicle upon which the rim is mounted, and the flange at the opposite end of the rim is disposed to face outwardly of the vehicle, and said one side of said wall section faces said opposite end of said rim.

* * * * *

(12) EX PARTE REEXAMINATION CERTIFICATE (9036th)
United States Patent
Howald et al.

(10) Number: US 6,474,383 C1
(45) Certificate Issued: May 29, 2012

(54) AUTOMOTIVE WHEEL WITH IMPROVED INFLATION SYSTEM

(75) Inventors: Gene A. Howald, New Hope, PA (US); Pascal Seradarian, Princeton, NJ (US)

(73) Assignee: Hutchinson, SA, Paris (FR)

Reexamination Request:
No. 90/011,712, May 25, 2011

Reexamination Certificate for:
Patent No.: 6,474,383
Issued: Nov. 5, 2002
Appl. No.: 09/867,513
Filed: May 31, 2001

(51) Int. Cl.
*B60C 29/00* (2006.01)

(52) U.S. Cl. .................. 152/418; 152/417; 152/427
(58) Field of Classification Search .................. 152/416, 152/418, 428
See application file for complete search history.

(56) References Cited

To view the complete listing of prior art documents cited during the proceeding for Reexamination Control Number 90/011,712, please refer to the USPTO's public Patent Application Information Retrieval (PAIR) system under the Display References tab.

*Primary Examiner* — Matthew C. Graham

(57) ABSTRACT

An automotive wheel rim has intermediate its ends a wall extending transversely of the axis of said rim and having formed therein a first air duct opening at one end on the outer periphery of the rim for communication with the interior of a tire mounted thereon, and at its opposite end on the outboard side of the wall. A second duct formed within the wall opens at one end on the outboard side of the wall and at its opposite end on the inboard side of the wall for connecton to a tire inflation system. A tire inflation control valve is secured to the outboard side of the wall and has therein a pair of air inlet/outlet ducts sealingly secured in communication with the ends of the first and second ducts where they open on the outboard side of the wall.

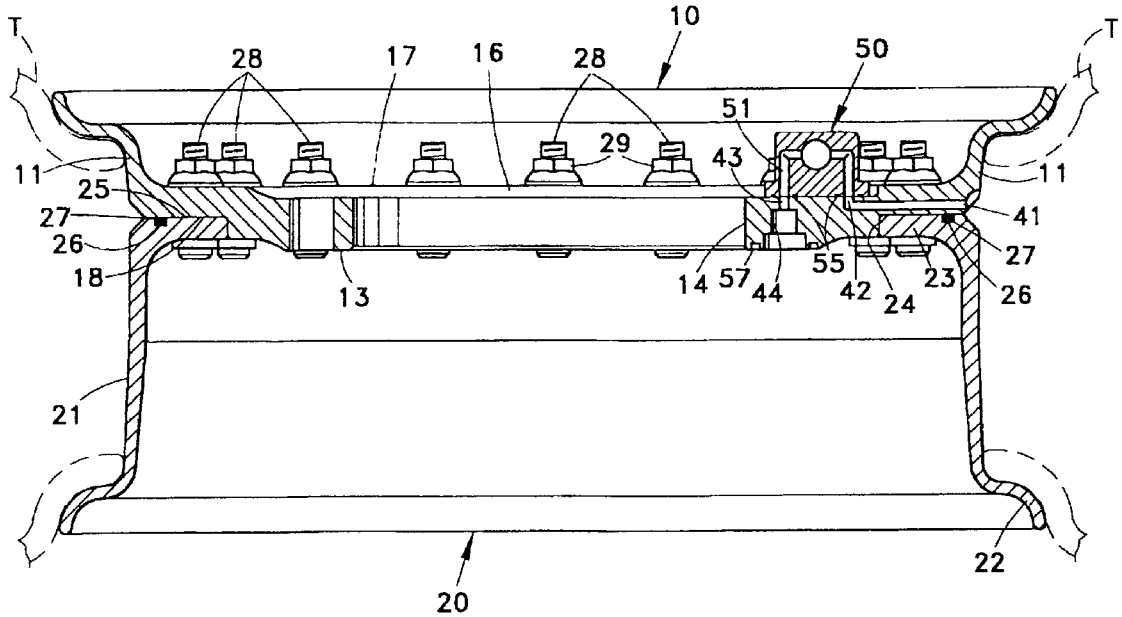

US 6,474,383 C1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

Claims 2-10, dependent on an amended claim, are determined to be patentable.

New claims 11-20 are added and determined to be patentable.

1. An automotive wheel for use with a tubeless tire, comprising
    a circular rim having formed coaxially on opposite ends thereof outwardly flaring circumferential flange sections disposed to be engaged by the beads of a tubeless tire mounted on the rim, *an outer periphery of the rim being defined between said circumferential flange sections*,
    said rim having intermediate said opposite ends thereof a transverse wall section extending transversely of the axis of said rim, and having therethrough a central opening disposed coaxially of said axis,
    a first air duct formed within said wall section to open at one end thereof on the outer periphery of said rim for communication with the interior of the tire mounted thereon, and opening at the opposite end thereof on one side of said wall section,
    a second air duct formed within said wall section to open at one end on said one side of said wall section and opening at its opposite end on the opposite side of said wall section for connection to a tire inflation system, and
    a tire inflation control valve secured to said one side of said wall section and having therein a pair of air inlet/outlet ducts, one of said pair of ducts being sealingly secured at one end thereof to said opposite end of said first duct, and the other of said pair of ducts being sealingly secured at one end thereof to said one end of said second duct.

*11. An automotive wheel for use with a tubeless tire, the wheel comprising:*
    *a circular rim having formed coaxially on opposite ends thereof outwardly flaring circumferential flange sections disposed to be engaged by the beads of a tubeless tire mounted on the rim, an outer periphery of the rim being defined between said circumferential flange sections;*
    *the rim having intermediate the opposite ends thereof a transverse wall section extending transversely of an axis of the rim, and having therethrough a central opening disposed coaxially of the axis;*
    *a first air duct formed by the wall section, wherein a first end of the first air duct is formed by the wall section to open on the outer periphery of the rim for communication with the interior of the tire mounted thereon, and wherein a second end of the first air duct is formed by the wall section to open on a first side of the wall section;*
    *a second air duct formed by the wall section, wherein a first end of the second air duct is formed by the wall section to open on the first side of the wall section, and wherein a second end of the second air duct is formed by the wall section to open on a second side of the wall section for connection to a tire inflaton system; and*
    *a tire inflation control valve secured to the first side of the wall section, the tire inflation control valve having an inlet duct and an outlet duct, wherein a first end of the inlet duct is sealingly secured to the first end of the second air duct, and wherein a first end of the outlet duct is sealingly secured to the second end of the first air duct.*

*12. An automotive wheel as defined in claim 11, wherein the wall section of the rim has therethrough outwardly of the central opening a circular array of openings for use in mounting the rim on an axle of a vehicle with the first side of the wall section facing outwardly of the vehicle.*

*13. An automotive wheel as defined in claim 11, wherein the rim is made of forge aluminum.*

*14. An automotive wheel as defined in claim 11, wherein:*
    *the wall section is one of two wall sections of the rim releasably secured together to extend transversely of the axis of the rim; and*
    *the other of the two wall sections has therethrough a central opening larger than and disposed coaxially of the central opening on the one of two wall sections.*

*15. An automotive wheel as defined in claim 14, wherein:*
    *radially outwardly of the central openings registering portions of the wall sections have thereon confronting, circumferential surfaces engaged one with the other; and*
    *a resilient O-ring is sealingly secured between the confronting, circumferential surfaces and radially outwardly of the control valve.*

*16. An automotive wheel as defined in claim 15, wherein the two wall sections are releasably secured together by a plurality of nut and bolt combinations arranged in a circular array coaxially of the rim, and with the bolt of each such combination extending through a pair or registering openings in the registering portions of the wall sections.*

*17. An automotive wheel as defined in claim 11, wherein:*
    *the second end of the first air duct and the first end of the second air duct are spaced a predetermined distance from each other;*
    *the first end of the inlet duct and the first end of the outlet duct are spaced the predetermined distance from each other;*
    *the first end of the inlet duct registers coaxially with the first end of the second air duct; and*
    *the first end of the outlet duct registers coaxially with the second end of the first air duct.*

*18. An automotive wheel as defined in claim 11, wherein the second end of the second air duct has therein a counterbore for accommodating a fitting of the tire inflation system.*

*19. An automotive wheel as defined in claim 11, wherein:*
    *the first side fo the wall section has therein a shallow, circumferential recess surrounding the central opening coaxially thereof;* the second end of the first air duct and the first end of the second air duct form a pair of spaced, circular openings in a bottom of the circumferential recess;

the first end of the second air duct is registered with the first end of the inlet duct and is sealingly connected with the first end of the inlet duct via a first intervening resilient O-ring; and the second end of the first air duct is registered with the first end of the outlet duct and is sealingly connected with the first end of the outlet duct via a second intervening resilient O-ring.

20. An automotive wheel as defined in claim 11, wherein:

the circumferential flange section at one end of the rim is disposed to face inwardly of a vehicle upon which the rim is mounted, and the circumferential flange section at the opposite end of the rim is disposed to face outwardly of the vehicle; and the first side of the wall section faces outwardly of the vehicle.

\* \* \* \* \*